United States Patent
Mower et al.

(10) Patent No.: US 8,102,897 B1
(45) Date of Patent: Jan. 24, 2012

(54) DIRECT SEQUENCE SPREAD SPECTRUM SYSTEM AND METHOD WITH PLURAL CHIPPING RATES

(75) Inventors: Vaughn L. Mower, Bountiful, UT (US); Merle L. Keller, Salt Lake City, UT (US); Kent R. Bruening, Sandy, UT (US)

(73) Assignee: L-3 Communications, Corp., New York, NY (US)

( * ) Notice: Subject to any disclaimer, the term of this patent is extended or adjusted under 35 U.S.C. 154(b) by 543 days.

(21) Appl. No.: 12/361,128

(22) Filed: Jan. 28, 2009

(51) Int. Cl.
*H04B 1/69* (2011.01)

(52) U.S. Cl. ........ 375/146; 375/141; 375/149; 375/308; 375/150; 375/152; 370/335; 370/441; 370/342

(58) Field of Classification Search .................. 375/146, 375/147, 141, 149, 308, 150, 152; 370/335, 370/441, 342
See application file for complete search history.

(56) References Cited

U.S. PATENT DOCUMENTS

| | | | |
|---|---|---|---|
| 4,638,494 A | 1/1987 | Kartchner et al. | |
| 5,488,631 A | 1/1996 | Gold et al. | |
| 5,751,761 A | 5/1998 | Gilhousen | |
| 6,091,760 A | 7/2000 | Giallorenzi et al. | |
| 6,944,211 B2 | 9/2005 | Mower et al. | |
| 7,065,127 B2 | 6/2006 | Keller et al. | |
| 7,167,504 B1 | 1/2007 | Mower et al. | |
| 7,190,711 B2 | 3/2007 | Keller et al. | |
| 7,200,233 B1 | 4/2007 | Keller et al. | |
| 7,221,665 B1 | 5/2007 | Mower et al. | |
| 7,321,609 B1 | 1/2008 | Keller et al. | |
| 7,403,583 B1 | 7/2008 | Bruening et al. | |
| 2002/0110140 A1* | 8/2002 | Juntti et al. | 370/441 |
| 2004/0013175 A1* | 1/2004 | Tanaka | 375/149 |
| 2006/0198342 A1* | 9/2006 | Uesugi | 370/335 |
| 2006/0274817 A1* | 12/2006 | Lakkis | 375/141 |
| 2010/0310009 A1* | 12/2010 | Lakkis | 375/308 |

* cited by examiner

*Primary Examiner* — Eva Puente
(74) *Attorney, Agent, or Firm* — Kirton & McConkie; N. Kenneth Burraston

(57) ABSTRACT

Direct sequence spread spectrum communications can use composite codes and can operate at a plurality of different chipping rates. The composite codes can be formed using a plurality of component codes, wherein the component codes can be relatively prime and at least one of the nominal lengths of the component codes can include a plurality of prime number multiplicands. The chipping rate and code length can be reduced by dividing a master rate by one or more of the prime number multiplicands. Symbol timing and time division multiple access timing can be tied to epochs of the component codes.

28 Claims, 5 Drawing Sheets

DIRECT SEQUENCE SPREAD SPECTRUM SYSTEM AND METHOD WITH PLURAL CHIPPING RATES

FIELD

The present application relates to spread spectrum systems. More particularly, the present application relates to direct sequence spread spectrum systems using composite spreading codes.

BACKGROUND

Spread spectrum techniques can be used to provide a degree of covertness and anti-jam capability to a communications system. In transmission, a spreading code is used to expand the bandwidth of transmitted signals. The transmitted signals can have a relatively large bandwidth as compared to the bandwidth of information encoded into the transmitted signals. For intended receivers, the spreading codes are known, and can be removed once synchronization has been obtained. The process of removing the spreading code in the receiver can also provide benefits in reducing the effects of interference and/or jamming (this benefit is sometimes referred to as processing gain). For adversaries who lack knowledge of the spreading code, detection of and synchronization to the transmitted signal can be difficult. Jamming a spread spectrum signal can also be difficult, since, without knowledge of the spreading code, the intended receiver gains an advantage over the would-be jammer approximately equal to the processing gain.

Spread spectrum processing adds some complexity and cost to a communications system. Detection and demodulation of a spread spectrum signal generally includes creating a local replica of the spreading code, synchronizing the timing of the local code replica to the transmitter, and removing the spreading code from the received signal. This additional processing can require additional signal processing hardware to be included in the communications system as compared to a conventional non-spread system.

Operating rates in a spread spectrum system are also typically much higher than conventional (non-spread) systems. For example, a conventional (non-spread) communications system operating at a 1 Mb/s data rate may use digital circuitry clocked at a 2 MHz rate. In contrast, a spread spectrum system operating at the same 1 Mb/s data rate may use a 100 MHz chip rate for the spreading code, and thus operate some of the digital circuitry at 50 or 100 times the clock rate of the conventional (non-spread) system. These higher clock rates can translate into higher hardware cost and higher power consumption.

Increasingly, communications systems are accommodating heterogeneous types of communications terminals. For example, some terminals in a system may be disadvantaged in terms of power availability or other characteristics. To provide communications in a spread spectrum system, it is generally necessary for all of the terminals in communications to operate using the same spreading codes and spreading (chipping) rates. Accordingly, to provide communications in a heterogeneous network has generally involved designing all of the terminals to operate using a particular combination of spreading code types, spreading rates, data rates, and other communications parameters. Such an approach can undesirability limit the overall capability of the communications system. For example, limiting all of the terminals in the network to provide only the minimum performance provided by the least capable terminal in the network may waste higher potential throughput available between some pairs of terminals.

SUMMARY

Accordingly, it has been recognized by the present inventors that it would be desirable to develop techniques to allow a spread spectrum communications system to provide multiple modes of operation by which both highly capable terminals and disadvantaged terminals can be accommodated.

In some embodiments of the invention, a method of accommodating multiple chipping rates in a direct sequence spread spectrum system is provided. The method can include providing a plurality of at least three predefined component codes. Each one of the plurality of component codes can have a corresponding nominal length. The nominal lengths can be relatively prime to each other. At least one of the nominal lengths can include a plurality of prime number multiplicands. A plurality of composite spreading codes corresponding to a plurality of different chipping rates can be formed. The different chipping rates can be a master rate divided by selected ones (one or more) of the prime number multiplicands. The composite spreading code can be formed by a logical combination of the component codes. The composite code can be used for communication of direct sequence spread signals.

In some embodiments of the invention, a direct sequence spread spectrum communications system is provided. The system can include a plurality of at least three predefined component codes. Each one of the plurality of component codes can have a corresponding nominal length, and the nominal lengths can be relatively prime to each other. At least one of the nominal lengths can include a plurality of prime number multiplicands. A plurality of composite spreading codes corresponding to a plurality of different chipping rates can be derived from a master rate. For each one of the different chipping rates, the chipping rate can be the master rate divided by selected ones of the prime number multiplicands. The composite code can be formed by a logical combination of the component codes. The system can include a plurality of communications terminals configured to communicate with each other using direct sequence spread spectrum signals. The direct sequence spread spectrum signals can use a code equal to one of the plurality of composite spreading codes and a chipping rate equal to one of the plurality of different chipping rates.

In some embodiments of the invention, a direct sequence spread spectrum system is provided that accommodates variable chipping rates. The system can include a plurality of at least three predefined component codes, and each one of the component codes can have a corresponding nominal length. The nominal lengths can be relatively prime to one another. At least one of the nominal lengths can include a plurality of prime number multiplicands. A first terminal can include a first transmitter configured to transmit a direct sequence spread signal using a first chipping rate and a first composite code, wherein the first composite code is generated by logically combining the component codes. A second terminal can include a second transmitter configured to transmit a direct sequence spread signal using a second chipping rate and a second composite code. The second chipping rate can equal the first chipping rate divided by at least one of the plurality of prime number multiplicands. The second composite code can be generating by logically combining the component codes, wherein at least one of the component codes has a shortened length equal to the corresponding nominal length divided by the at least one of the plurality of prime number multiplicands.

In some embodiments of the invention, a receiver capable of operating at different chipping rates is provided. The receiver can include a clock source configured to provide a clock and a plurality of at least three component code generators coupled to the clock source. The component code generators can each be configured to generate a component pseudo random sequence having a corresponding nominal length. The nominal lengths of the component code generators can be relatively prime. The nominal length of at least one of the component code generators can be divisible by a plurality of prime number multiplicands. A logical combiner can be coupled to the component code generators and configured to logically combine the component pseudo random sequences to form a composite code. A slot generator can be configured to define time division multiple access slots in alignment with an epoch of at least one of the plurality of at least three component code generators. A scheduler can be configured to select at least one of the plurality of prime multiplicands for each slot. The clock to the selected one of the component code generators can be divided by the at least one of the plurality of prime multiplicands, and the length of the selected one of the component code generators can be divided by the at least one of the plurality of prime number multiplicands. The composite code can be used for despreading a receive signal.

In some embodiments of the invention, a transmitter capable of operating at different chipping rates is provided. The transmitter can include a clock source configured to provide a clock and a plurality of at least three component code generators coupled to the clock source. The component code generators can each be configured to generate a component pseudo random sequence having a corresponding nominal length. The nominal lengths of the component code generators can be relatively prime. The nominal length of at least one of the component code generators can be divisible by a plurality of prime number multiplicands. A logical combiner can be coupled to the component code generators and configured to logically combine the component pseudo random sequences to form a composite code. A slot generator can be configured to define time division multiple access slots in alignment with an epoch of at least one of the plurality of at least three component code generators. A scheduler can be configured to select at least one of the plurality of prime multiplicands for each slot. The clock to the selected one of the component code generators can be divided by the at least one of the plurality of prime multiplicands, and the length of the selected one of the component code generators can be divided by the at least one of the plurality of prime number multiplicands. The composite code can be used for spreading a transmit signal.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
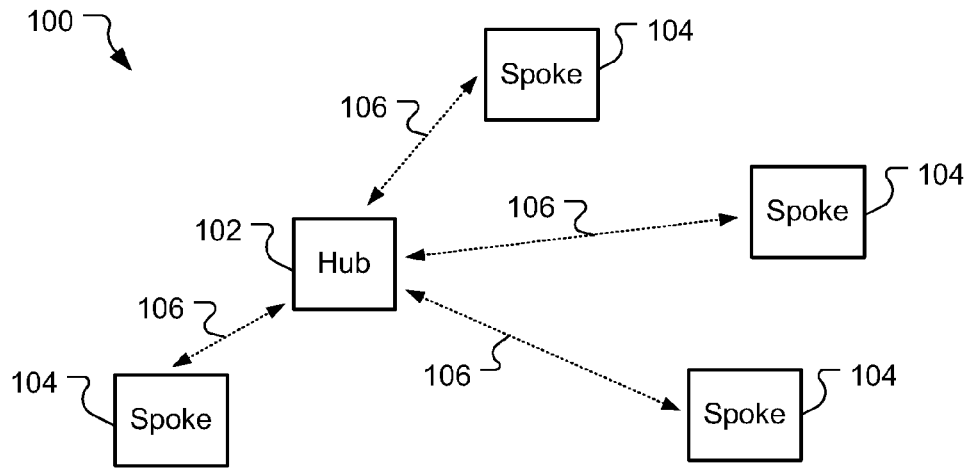
FIG. 1 is a block diagram of a spread spectrum communication system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. As a particular example, in a digital electronics systems, two clock edges can be substantially time coincident when they are generated or triggered by a common event. The clock edges may not be precisely aligned, however, due to factors such as differing propagation delays in digital gates, clock jitter, noise, and similar factors. As another example, time synchronization of radio signals is dependent upon propagation delays, and thus synchronization can be dependent upon relative position of transmission and reception devices.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or subranges encompassed within that range as if each numerical value and sub-range is explicitly recited. As an illustration, a numerical range of "about 1 to 5" should be interpreted to include not only the explicitly recited values of about 1 to 5, but also include individual values and sub-ranges within the indicated range. Thus, included in this numerical range are individual values such as 2, 3, and 4 and sub-ranges such as 1-3, 2-4, and 3-5, etc. This same principle applies to ranges reciting only one numerical value and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a spread spectrum communications system is illustrated in accordance with some embodiments of the present invention, from which some problems that can be solved by the present invention will be explained. The system, shown generally at 100, can include a hub terminal 102, and a plurality of spoke terminals 104. Such a system can be referred to as a hub-spoke network. The hub terminal can communicate with the spoke terminals through communications links 106. Although the communications links are shown as being direct links between the hub terminals and the spoke terminals, it will be understood that the communications links can be made, alternatively or in addition, through a relay, repeater, satellite, or other nodes (not shown). The communications links will generally be described as a two-way (e.g., full duplex) communications links, although it is to be understood that the communications links can, alternatively or in combination, be one-way (e.g., half duplex) communications links. In addition, not all of the communications links in the system need be identical or active at the same times. Moreover, while the discussion below is presented primarily in the context of a hub-spoke network, it is to be understood that the below techniques are not limited to application to a hub-spoke network, and can be applied to other network topologies as well. Further, it will be appreciated that various relative positions of the hub terminal and spoke terminals can be used, and thus the invention is not limited to any particular topology. For example, the system can include mobile spoke terminals, fixed spoke terminals, mobile hub terminals, fixed hub terminals, or combinations thereof. More than one hub terminal can be included in the system. Mobile terminals can be mounted on ground vehicles, airborne platforms, and the like. Terminals can enter and leave the system during operation.

As mentioned above, one challenge in a communications system, such as the system 100 of FIG. 1, can be to provide communications when some spoke terminals 104 are disadvantaged relative to other spoke terminals. For example, a terminal can be disadvantaged because it has limited prime power capability. Prime power capability limitations can limit the clock rates that can be supported, limit the power available for transmission, limit the data rates and/or chips rates at which operation is possible, and/or introduce other limitations. Alternately, a communications terminal can be disadvantaged for other reasons, for example, being limited in bandwidth capability. Other spoke terminals 104, however, can have significant communications capabilities, for example, being able to operate at very high data rates and/or very high chipping rates.

Accordingly, in some embodiments of the invention, the system 100 can use composite codes constructed in such a way that a plurality of different chipping rates and/or a plurality of different data rates can be used in the system. The composite codes can be constructed using a plurality of at least three component codes as will now be explained. A composite code can be formed by a logical combination of component codes, wherein each of the component codes has a different component code length, and the component code lengths are relatively prime to each other. In such a case, the length of the composite code is equal to the product of the component code lengths. Accordingly, from multiple relatively short component codes, a very long composite code can easily be produced. Depending on the particular logical combining function used to combine the component codes, different cross-correlation properties of the component codes and the composite codes can be obtained. Particular logical combining functions and cross correlation properties can be used to facilitate initial synchronization and operation of the system. For example, U.S. Pat. Nos. 6,944,211; 7,065,127; 7,190,711 and 7,221,665, all commonly owned with the present application, disclose various techniques for generating and using composite codes, which can be applied within the present system.

At least one of the component codes can include a plurality of prime number multiplicands. We can refer to component code having the plurality of prime number multiplicands as the variable length code, as will become clear shortly. From the plurality of at least three component codes, a plurality of different chipping rates and corresponding reduced-rate composite codes can be generated as follows.

A master composite code can be generated from a logical combination of the component codes. Spread spectrum signals can be encoded using the master rate as the chipping rate. Reduced-rate codes can be generated by selecting one or more of the prime number multiplicands to form a divider (excluding 1 as a multiplicand). Using the divider, a reduced chipping rate equal to the master rate divided by the divider can be used, and the corresponding reduced-rate component code can be formed by a logical combination of the component codes, wherein the variable length code is shortened. The variable length component code can shortened by reducing its length by the dividing by the factor. In other words, if the variable length component code has a nominal length equal to the product of the prime number multiplicands, the reduced-rate component code can have a length equal to the product of the prime number multiplicands excluding the divider. Thus, the reduced-rate composite code can also have its length shortened.

A plurality of reduced chipping rate codes can be produced by selecting a number of different corresponding dividers. For example, a component code that has prime number multiplicands of 2, 2, 3, 5 and 7 can be used to produce reduced chipping rate codes and lengths equal to $\frac{1}{2}$, $\frac{1}{3}$, $\frac{1}{4}$, $\frac{1}{5}$, $\frac{1}{6}$, $\frac{1}{7}$, $\frac{1}{10}$, $\frac{1}{12}$, $\frac{1}{14}$, $\frac{1}{15}$, $\frac{1}{20}$, $\frac{1}{21}$, $\frac{1}{28}$, $\frac{1}{30}$, ... $\frac{1}{420}$ of the master chipping rate. As another example, a component code that has prime number multiplicands of $2^n$ (n being an integer) can be used to produce reduced chipping rate codes and lengths equal to $\frac{1}{2}$, $\frac{1}{4}$, $\frac{1}{8}$, $\frac{1}{16}$, ... of the master chipping rate. Accordingly, the hub terminal 102 and spoke terminals 104 can use any one of the plurality of reduced chipping rate codes. It is to be understood that, at a given time, a hub terminal and a spoke terminal in communication with each other will use the same one of the plurality of reduced chipping rate codes to effect communications. For example, as described further below, the hub terminal can switch between different ones of the reduced chipping rate codes when communicating with different ones of the spoke terminals, with some of the spoke terminals operate at different chipping rates than other ones of the spokes terminals.

For example, the hub terminal 102 can be capable of operating using any one of the plurality of chipping rate codes (including the master chipping rate and the plurality of reduced chipping rates). The spoke terminals 104 can have differing capabilities. For example, one or more hub terminals can also be capable of operating using any one of the plurality of chipping rates. One or more hub terminals can have reduced capability, and be capable of operating in only some of the plurality of chipping rates. For example, some hub terminals can use a reduced chip clock.

To effect communications between the hub terminal 102 and a spoke terminal 104, the hub terminal and the spoke terminal can be configured to use the same chipping rate and composite code. For example, the system 100 can include link using a time division multiple access (TDMA) structure having frames and slots, and communications between different terminals confined to occur during individual ones of the slots. For example, a TDMA link can be used for transmissions from the hub terminal to the spoke terminals, from the spoke terminals to the hub terminal, or both. As a particular examine, the hub terminal can control which terminals transmit and receive in each slot, and can define communications parameters (e.g., chipping rate, composite code, symbol rate, etc.) to be used during each slot.

Direct sequence signals can be transmitted and received using the composite code, which can be applied to a transmission signal in a process referred to as spreading, and can be removed from a received signal in a process referred to as despreading. Generally, the chipping rate of the composite code is selected to be substantially higher than the symbol rate associated with the data encoded into the spread spectrum. The relationship of data rate and symbol rate is dependent on the modulation format used, forward error correction coding (if any), and overhead (e.g., preambles, etc.) included in the transmission. Higher chipping rates generally correspond to wider signal bandwidths, and accordingly, by varying the chipping rate, the bandwidth of the signal can be varied. Accordingly, for terminals using reduced chipping rates as defined above, the signal bandwidths can be proportionally scaled to the chipping rates. Reduced signal bandwidths can correspond to reduced clocking rates and reduced power consumption in a terminal. Thus, for example, reduced chipping rates can be advantageously applied when a terminal is prime power limited.

The symbol rate used for communications between terminals can be tied to the chipping rate to simplify the synchronization process. For example, symbol rates can be aligned to an epoch of one or more of the component codes. An epoch occurs once per length of the component code, and can be, for example, the beginning of the code, the end of the code, or correspond to a particular state of the code generator. The symbol duration can correspond to an integer multiple of the length of one or more of the component codes. The symbol duration can have a constant duration for multiple ones of the chipping rates, as shown by examples further below. Tying the symbol timing to the component code timing can help to simply synchronization, since synchronization to the component code timing automatically provides symbol timing synchronization. Symbol rates can also be changed during operation since a number of differing symbol rates can be defined, and the differing symbol rates can have symbol timing that is synchronized to the component codes.

In a TDMA link, the slots can also be tied to the chipping rate to simplify the synchronization process. For example, frame and slot boundaries can be aligned to an epoch of one or more of the component codes. The frame and slot duration can correspond to integer multiples of the length of one or more of the component codes. The slot duration can have a constant duration for multiple ones of the chipping rates, as shown by examples further below.

If desired, the symbol timing and TDMA timing can be tied to the same epochs. In other words, for a three component composite code (e.g., comprising an X code, a Y code, and a Z code), the symbol timing and TDMA timing can be tied to combined epochs of the X code and the Y code. In other words, the beginning of a symbol, the beginning of a TDMA slot, and the beginning of a TDMA frame can be substantially time coincident with the time at which both the X code and Y code are at their beginnings.

As a particular example, one set of chipping rates, slot durations, and symbol rates will now be illustrated. It will be appreciated that the invention is not limited to this particular example, and that many other combinations of chipping rates, slot durations, and symbol rates can be used following the general principles outlined herein.

A master chipping rate of $R_m$=100 MHz can be used. Three component codes, referred to as the X code, Y code, and Z code can be used. The X code can have a length of $L_x=2^n=2^{14}=16,384$. The X code length thus has the prime number multiplicand 2, repeated 14 times. The Y code can have a length of $L_y=2^m-1=2^{12}-1=4,095$. The Y code length can thus have the prime number multiplicands 3, 3, 5, 7, 13 (3*3*5*7*13=4,095). The Z code can have a length of $L_z=2^p-1=2^{17}-1=131,071$. The Z code length can have prime number multiplicands not equal to any of the prime number multiplicands of the X code length and the Y code length. Thus, the master code length can be equal to $L_xL_yL_z=8.8*10^{12}$. The master chipping rate of 100 MHz can thus result in the master code having a repeat time interval of about 24 hours. In contrast, the X code repeats about every 164 microseconds, the Y code repeats about every 41 microseconds, and the Z code repeats about every 1.3 milliseconds.

Reduced chipping rates can be obtained at rates $R_c=R_m/2^q$, wherein q=1, 2, . . . 14. Accordingly, reduced chipping rates can use chip clocks at 50 MHz, 25 MHz, 12.5 MHz, etc.

For a TDMA link, the frame length and slot timing can be aligned to an XY code epoch. For the master chipping rate, the XY code length can be $L_{xy}=L_xL_y$=16,384*4,095=67,092,480 chips. The XY code epoch can therefore occur every $L_xL_y/R_m$=0.67 seconds. For reduced chipping rate frames, the XY code epoch can remain unchanged as follows. For scaled rate $R_c=R_m/2^q$, the X code can be shortened to length $L_x'=L_x/2^q$. The XY epoch can therefore occur in the reduced chipping rate composite code at intervals of $L_x'L_y/R_c=(L_x/2^q)(L_y)/(R_m/2^q)=L_xL_y/R_m$=0.67 seconds. Accordingly, the TDMA slot and frame timing can be maintained at a constant duration for a plurality of different chipping rates.

Symbol rates can be derived in a similar manner. For example, symbol rates can be selected as $R_s=R_m/2^r$, wherein r=1, 2, . . . 14. Hence, symbol duration can also be maintained at a constant duration for a plurality of different chipping rates. For example, a symbol rate of 1.5625 MHz (r=6) can be obtained for chipping rates of 100 MHz (q=0), 50 MHz (q=1), 25 MHz (q=2), 12.5 MHz (q=3), 6.25 MHz (q=4), 3.125 MHz (q=5) and 1.5625 MHz (q=6).

While the above example has focussed primarily on varying the length by shortening the length of the X code and using prime number multiplicands of the X code length, prime number multiplicands of the Y code length and/or Z code length can also be used. For example, the Y code length can have prime number multiplicands of 3, 3, 5, 7 and 13, and thus reduced chipping rates, symbol rates, and/or frame rates can be obtained that are equal to $R_m/3$, $R_m/5$, $R_m/7$, $R_m/9$, $R_m/13$, $R_m/15$, etc. Even more generally, both the X code and the Y code can be shortened to allow reduced chipping rates equal to $R_m/6$, $R_m/10$, $R_m/12$, $R_m/14$, etc. Similarly, symbol rates and slot lengths can be obtained in similar manners. Thus, more generally, the duration of the symbol rate and TDMA slot length can be selected to be an integer multiple of an epoch $L_x'L_y'/R_c$ wherein the shortened X code length $L_x'$ and the shortened Y code length $L_y'$ are shortened from the nominal lengths $L_x$, $L_y$ by dividing by one or more prime number multiplicands $L_x'=L_x/s$, $s=f_1*f_2* \ldots f_s$, $L_y'=L_y/t$, $t=f_1*f_2* \ldots f_t$, wherein $f_1 \ldots f_s$, $f_1 \ldots f_t$ are prime number multiplicands of the composite code lengths. For the example above, the prime number multiplicands can be the set of factors {2, 2, 2, 2, 2, 2, 2, 2, 2, 2, 2, 2, 2, 3, 3, 5, 7, 13}. Accordingly, a large number of different data rates and slot durations can be obtained for any one of a number of different chipping rates. As a specific example, the following chipping rates, data rates, and frame durations can be obtained from a master clock of 100 MHz using the above codes:

Chipping rates: 100, 50, 25, 12.5 MHz (corresponding to factors $2^q$, q=0, 1, 2, 3)

Symbol rates: 6.25, 4.17, 3.13, 2.50, 2.08, 1.79, 1.56, 1.39 MHz (corresponding to factors $2^{n+3}*3^m*5^p$, n=0, 1, 2; m=0, 1; p=0, 1)

TDMA frame duration: 0.67 seconds (corresponding to $L_xL_y$)

While the above example has illustrated maintaining a constant TDMA frame duration, if desired, the frame duration can also be scaled for reduced chipping rates. For example, for a reduced chipping rate, the TDMA frame length can be increased to provide better support for lower data rates.

For example, a reduced chipping rate can be obtained as $R_c=R_m/2^q=100/2^3=12.5$ MHz, reducing the chipping rate from the master rate by a factor of 8. The code length, however, can be changed by a factor of 4, resulting in Lx'y=16,384/4)(4,096)=16,773,120. The TDMA frame length is thus given by $T_f'=L_x'L_y/R_c=1.34$ seconds, increasing the frame length by a factor two.

Figure 2:
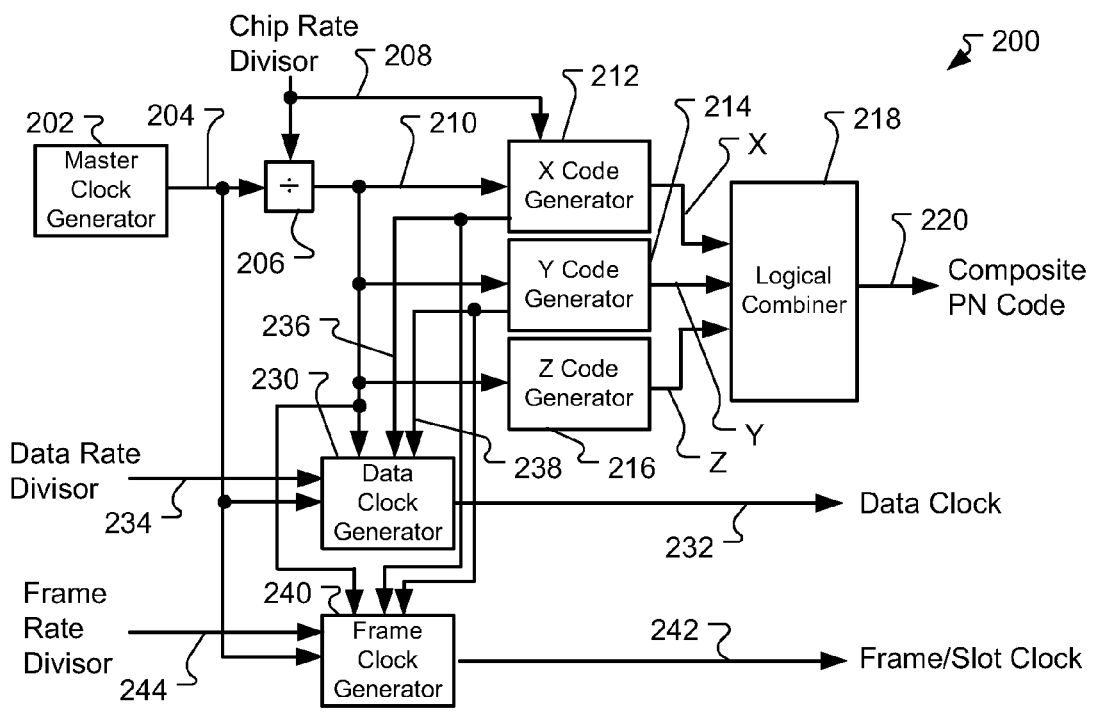
FIG. 2 is a block diagram of a composite code generator in accordance with some embodiments of the present invention.

Turning to FIG. 2, an example of a composite code generator is illustrated in accordance with some embodiments of the present invention. The composite code generator 200 can be used in a hub terminal (e.g. hub terminal 102 of FIG. 1) or a spoke terminal (e.g., spoke terminal 104 of FIG. 1) to generate spreading codes used in transmission and/or reception of spread spectrum signals. The composite code generator can include a master clock source 202 generating a master clock 204. For example, the master clock can have a frequency equal to a master chipping rate for a hub terminal or spoke terminal, or equal to a reduced chipping rate for a disadvantaged spoke terminal. If desired, the master clock frequency can be varied for frequency synchronization (e.g., link Doppler, etc.). The master clock can be divided by a divider 206 using a chipping rate divide ratio 208 to produce chip clock 210. The chip clock can be provided to the component code generators 212, 214, 216, which can generate component codes X, Y, Z. Component code generators can generate pseudo random component code sequences, for example, by using a linear feedback shift register or other structures. As discussed above, the chipping rate divide ratio can be a product of prime number multiplicands of one or more of the nominal lengths of the component codes (including a divide ratio of one when operation at the master chipping rate is desired). The chip rate divide ratio can also be provided to one or more code generators (e.g., the X code generator 212 as shown here) to allow the length of one or more of the component codes to be shortened. Alternately, a code length divisor not equal to the chip rate divisor (but equal to a product of prime number multiplicands of the component code) can be provided to a component code generator. The component codes can be combined in a logical combiner 218 on a chip-by-chip basis to produce to the composite code 220. The logical combiner can, for example, perform logical combining functions such as MOD, MAND, and MAJ. MOD provides the modulo-2 sum of the inputs, MAJ provides the majority vote of the inputs, and MAND is given by the Boolean expression MAND=A⊕(B·C), wherein A, B, and C are the component codes, "⊕" is the logical-exclusive-or function, and "·" is the logical-and function. While the invention is not limited to these particular logical functions, these particular functions provide various benefits as described in the above-referenced U.S. patents.

The composite code generator 200 can also include a data clock generator 230. The data clock generator can generate a data clock 232 by dividing the chip clock 210 using a data rate divisor 234. The data rate divisor can be a product of prime number multiplicands of one or more of the nominal lengths of the component codes, for example, as described above. The data rate divisor can accept epoch input 236, 238 (e.g., a clock identifying X code, Y code epochs, combined X code and Y code epochs, etc.) to assist in synchronizing the data clock to one or more of the component code epochs. For example, the data clock can be substantially time coincident with an epoch of the X and Y codes.

The composite code generator 200 can also include a time division multiple access frame clock generator 240. The frame clock generator can generate a frame clock 242 by dividing the chip clock 210 using a frame rate divisor 244. The frame rate divisor can be a product of prime number multiplicands of one or more of the nominal lengths of the component codes, for example, as described above. The frame clock generator can also use the epoch input 236 to assist in synchronizing the frame clock to one or more of the component code epochs. For example, the frame boundary can be substantially time coincident with the epoch of the XY codes.

The composite code generator 200 can be used in the transmitter or in the receiver of either (or both) a hub terminal and a spoke terminal as will be explained further below. In a spoke terminal, if desired, the clock generator 202 and divider 206 can be replaced with a lower frequency clock source, reducing the maximum clock rate (and thus limiting the terminal to operation at a subset of the plurality of chipping rates). For example, the master clock generator can operate at a frequency equal to the master chipping rate divided by one or more of the prime number multiplicands.

Figure 3:
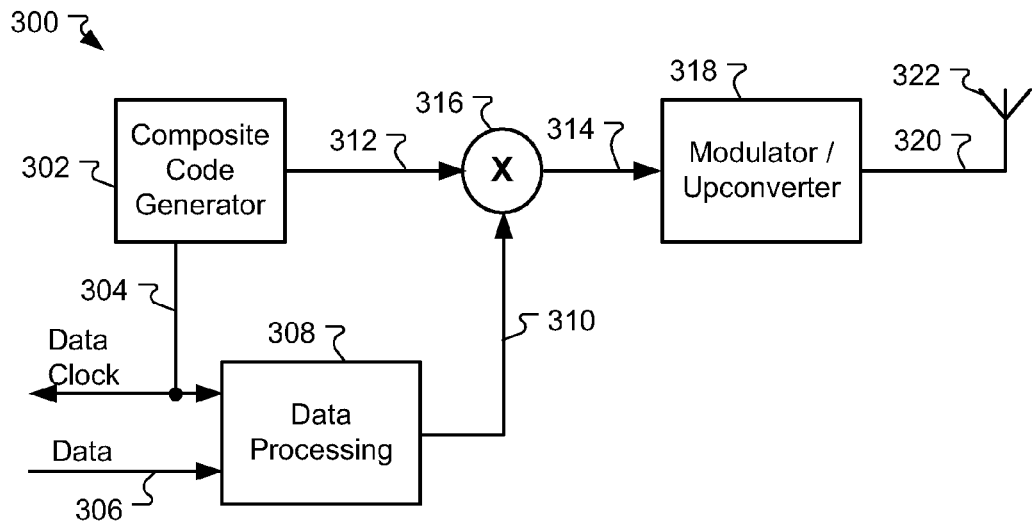
FIG. 3 is a block diagram of a direct sequence spread spectrum transmitter in accordance with some embodiments of the present invention.

FIG. 3 provides an example of a transmitter in accordance with some embodiments of the present invention, which can be used in a hub terminal or a spoke terminal. The transmitter 300 can include a composite code generator 302. For example, the composite code generator can be like composite code generator 200 of FIG. 2. The composite code generator can provide a data clock 304 used to clock user data 306 into the transmitter. User data can be accepted by a data processor 308. The data processor can provide, for example, functions such as multiplexing, forward error correction encoding, encryption, and similar functions to provide transmission data 310. The transmission data can be combined with a composite code 312 from the composite code generator to provide spread spectrum data 314 using a spreader 316. For example, the spreader can be an exclusive-or function or multiplier. The spread spectrum data can then be formed into a radio signal 320 by a modulator/upconverter 318, and transmitted using an antenna 322. Various types of spreaders, modulators, upconverters, and antennas and similar components can be used in embodiments of the present invention.

Alternatively, the transmitter can 300 can be rearranged to separate the modulator and upconverter components. For example, a modulator (not shown) can be placed after the data processing 308 so that transmission data 310 is converted into a modulated signal (not shown) and provided to the spreader 316 (instead of transmission data 310). The spreader can then combine the modulated signal with the composite code 312 to form a spread spectrum signal (instead of spread spectrum data 314) which is converted to a radio signal 320 by an upconverter 318.

Figure 4:
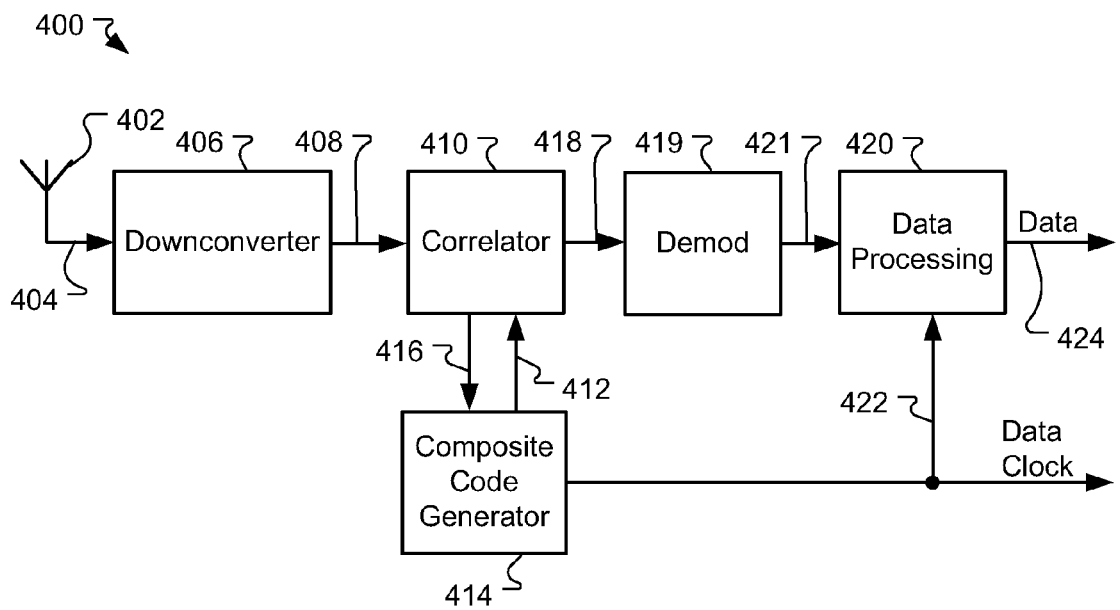
FIG. 4 is a block diagram of a direct sequence spread spectrum receiver in accordance with some embodiments of the present invention.

FIG. 4 illustrates a receiver in accordance with some embodiments of the present invention. The receiver 400 can be used in a hub terminal or a spoke terminal and can be capable of receiving spread spectrum signals transmitted from the transmitter of FIG. 3. The receiver can include an antenna 402 to receive radio signals 404, which can be processed by a downconverter/demodulator 406 to provide input signals to a correlator 410. Various types of antennas, downconverters, and correlators can be used in embodiments of the present invention. Input signals provided to the correlator can be, for example, complex baseband, intermediate frequency, digitized, or other format signals. The correlator can accept a composite code 412 generated by a composite code generator 414, and extract a chip clock 416 (or chip clock timing phase) from the received signal. For example, a chip clock generator (not shown) can be included in the composite code generator, and the chip clock phase adjusted during an acquisition process. The composite code generator can also generate a data clock 422. The composite code generator can, for example, be like composite code generator 300 described above in FIG. 3. Correlation results 418 can be provided to demodulator 419 and a data processor 420. The demodulator can extract symbol data 421, and the data processor can, for example, perform demultiplexing, forward error correction decoding, decryption, and similar functions to provide user data 424.

The transmitter of FIG. 3 and the receiver of FIG. 4 can be used in the system 100 of FIG. 1. For example, the transmitter and the receiver can be used in a hub terminal. As another example, the transmitter and receiver can be used in a spoke terminal. The transmitter and receiver can use the same or different master clock. Depending on the master clock used in the composite code generators 302, 402, a terminal can be capable of operating at different chipping rates. For example, a first terminal in a system can use a master clock of a first frequency that allows transmitting and receiving at 100 MHz and lower chipping rates. A second terminal in a system can use a master clock of a second frequency that allows transmitting and receiving at 25 MHz and lower chipping rates. A transmitter can be able to operate at higher chipping rates than the receiver can, or vice versa. As communication between a particular transmitter and a particular receive will generally occur only if the same chipping rate is used, common chipping rates for two different terminals (e.g., the first terminal and the second terminal) can be provided. For example, using the same set of component codes and defining reduced chipping rates using prime number multiplicands of the component code lengths can be performed as described above.

Figure 5:
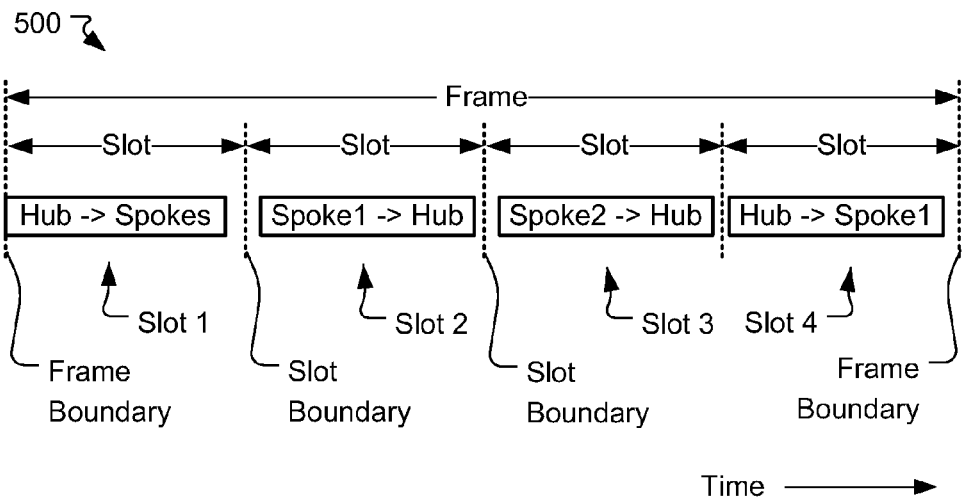
FIG. 5 is a timing diagram of a time division multiple access frame structure in accordance with some embodiments of the present invention.

A transmitter and/or receiver can be switchable into different chipping rates during operation to facilitate intercommunications between terminals. For example, in a TDMA link, different chipping rates can be used during different time slots depending on the capabilities of terminals that are to communicate during each time slot. FIG. 5 provides a timing diagram of a TDMA frame structure in accordance with some embodiments of the present invention. The TDMA frame can be broken into a plurality of slots. Communications can occur in individual slots between two or more terminals (e.g., point-to-point communications can occur between a pair of terminals, and multicast communications can occur between a first terminal and a plurality of second terminals). Transmissions can be substantially contained within an individual slot.

Communications over a TDMA link can use a composite code and chipping rates, which can be derived as described above. Thus, the frame boundaries and slot boundaries can be substantially time coincident with epochs of one or more of the component codes. Switching between different chipping rates can occur at slot boundaries. For example, in some embodiments a hub terminal can broadcast to all of the spoke terminals using a first chipping rate (e.g., slot 1), The broadcast can include, for example, allocations of subsequent slots to different terminals. During a subsequent slot (e.g., slot 2), a first spoke terminal can transmit to the hub terminal using a second chipping rate, different from the first chipping rate. During another subsequent slot (e.g., slot 3), a second spoke terminal can transmit to the hub terminal using a third chipping rate, different from the second chipping rate. During another subsequent slot (e.g., slot 4) the hub terminal can transmit to the first spoke terminal using the second chipping rate. Allocations of slots to terminals need not be fixed, and can be varied from frame to frame, for example, based on communications needs of the terminals.

In other embodiments, a TDMA link can be used for transmissions from spoke terminals to the hub terminal (e.g. as shown above for slot 2 and slot 3) and transmissions from the hub terminal to spoke terminals made using a different (e.g., frequency division multiple access) link.

Figure 6:
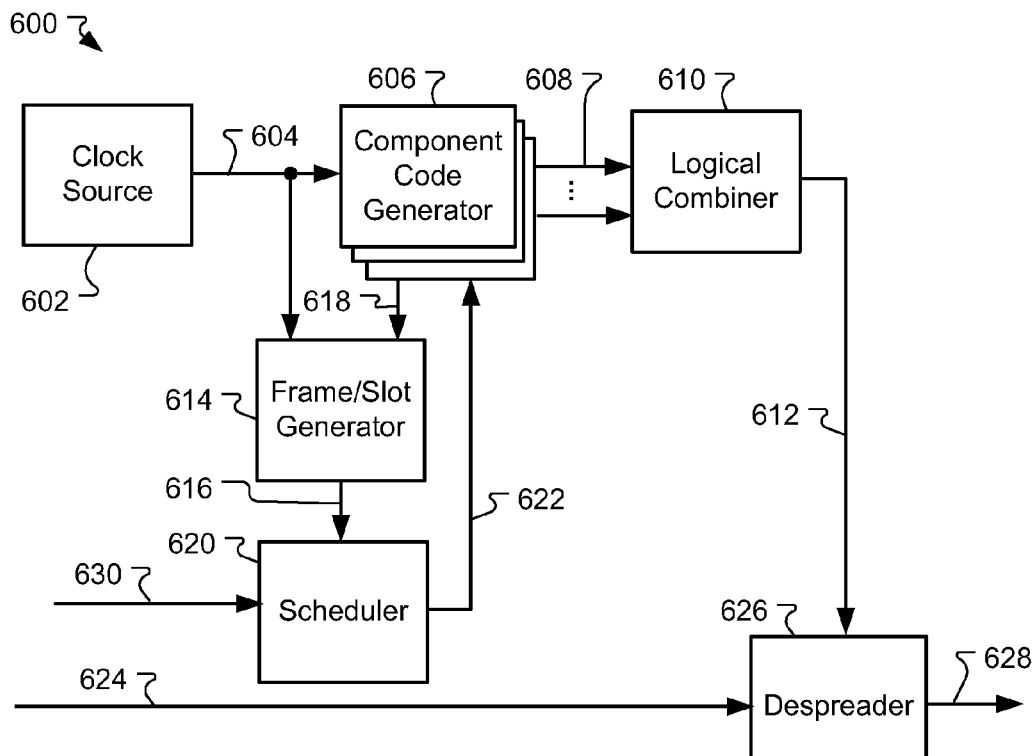
FIG. 6 is a block diagram of another configuration of a direct sequence spread spectrum receiver in accordance with some embodiments of the present invention.

FIG. 6 illustrates a block diagram of a receiver in accordance with some embodiments of the present invention that can be used to adjust the chipping rate on a slot-by-slot basis. The receiver 600 can include a clock source 602, which can provide a clock 604 to a plurality of component code generators 606. The component code generators can provide component codes 608, which can be combined by a logical combiner 610 to produce a composite code 612. Operation of the component code generators and logical combiner can be generally similar to that described above for component code generators 212, 214, 216 and logical combiner 218 of FIG. 3.

A frame/slot generator 614 can use the slot clock 604 and define slots so that frame and slot timing 616 is in alignment with an epoch of at least one of the plurality of component code generators 606. For example, one or more of the component code generators can provide an epoch signal 618 to the slot generator.

A scheduler 620 can be coupled to the clock source 602 and be configured to adjust the component code generators 606 for each slot via a control signal 622. For example, the scheduler can select at least one of the plurality of prime multiplicands of the component code lengths for each slot. The chipping rate can be adjusted based on the selected prime multiplicand, and if desired, the length of one or more of the component codes can also be adjusted, for example, as described above. Accordingly, the rate (and length) of the composite code 612 can be adjusted for each slot. As described above, frame and slot timing can remain constant.

The composite code 612 can be used to despread a received signal 624 in despreader 626, to provide despread signal 628. The received signal can be obtained from downconverting, demodulating, or similar functions (not shown) performed on a radio frequency signal. Accordingly, the receiver 600 can use a (reduced length) composite code and (reduced rate) chipping rate that is matched to the chipping rate and code of the received signal on a slot-by-slot basis. Additional data processing (not shown) can be performed on the despread signal, including, for example, symbol demodulation, forward error correction decoding, demultiplexing, decryption, and similar functions, if desired.

The scheduler 620 can include an input 630, which, for example, can provide instructions to the scheduler regarding the particular chipping rates and code lengths for each slot to be used. For example, the scheduler can extract such information from the despread received signal 628. For example, referring to FIG. 5, information can be transmitted from a hub terminal to spoke terminals during a slot (e.g., slot 1) to define chipping rates and code lengths to be used during subsequent slots, and this information can be provided to the scheduler 620 in a spoke receiver. As another example, the input to the scheduler can be provided by network management algorithms implemented in a hub terminal, for example, based on communications needs of the spoke terminals, by which allocations of slots to spoke terminals are dynamically determined.

Figure 7:
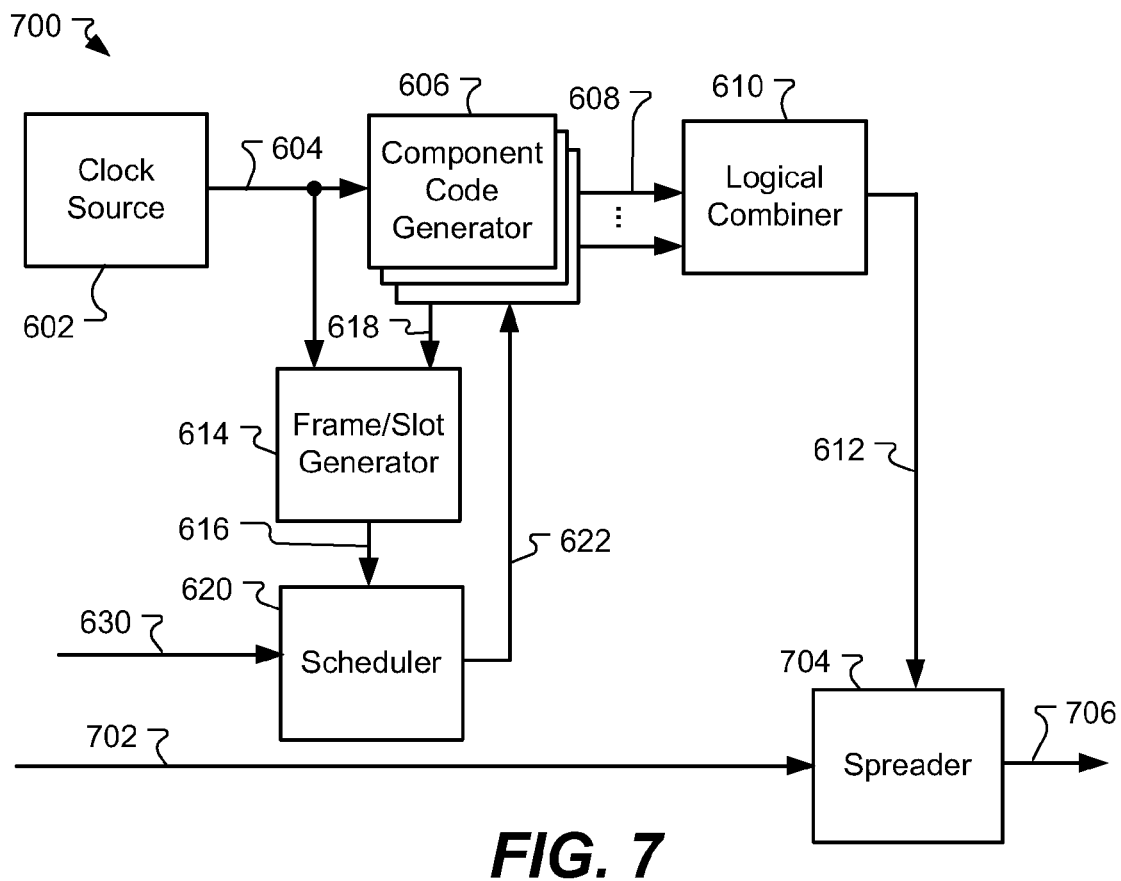
FIG. 7 is a block diagram of another configuration of a direct sequence spread spectrum transmitter in accordance with some embodiments of the present invention.

FIG. 7 illustrates a block diagram of a transmitter 700 that can be used to vary chipping rates on a slot-by-slot basis in accordance with some embodiments of the invention. The transmitter 700 can be generally similar to the receiver 600 of FIG. 6, and operation of the elements can be generally similar. The composite code 612 can be used in a spreader 704 to spread data 702 to form a spread signal 706. The transmitter can include data processing of the data prior to spreading, such as multiplexing, encryption, forward error correction encoding, and similar functions (not shown). The spread signal can be modulated, upconverted, and similar functions (not shown) to generate a radio frequency signal. The scheduler 620 in the transmitter can use input 630 obtained from a receiver or from a network management function as described above. Various modulation formats can be used, including without limitation, binary phase shift keying, quadrature phase shift keying, and offset quadrature phase shift keying.

A terminal can include a both a transmitter 700 and a receiver 600. If desired, portions of the transmitter and receiver can be shared within the terminal (e.g., providing full duplex communications using the same chipping rate and composite code for transmission and reception). Alternatively, the transmitter and receiver can include separate copies of the various elements (e.g., enabling full duplex communications using different transmit and receive chipping rates). Two terminals can accordingly be configured to enable communications between each other when their corresponding schedulers set the chipping rate and composite code lengths to be equal to each other during a slot.

Symbol rates used for communications between terminals can also be adjusted on a slot-by-slot basis in a similar manner to the chipping rate as described above.

Figure 8:
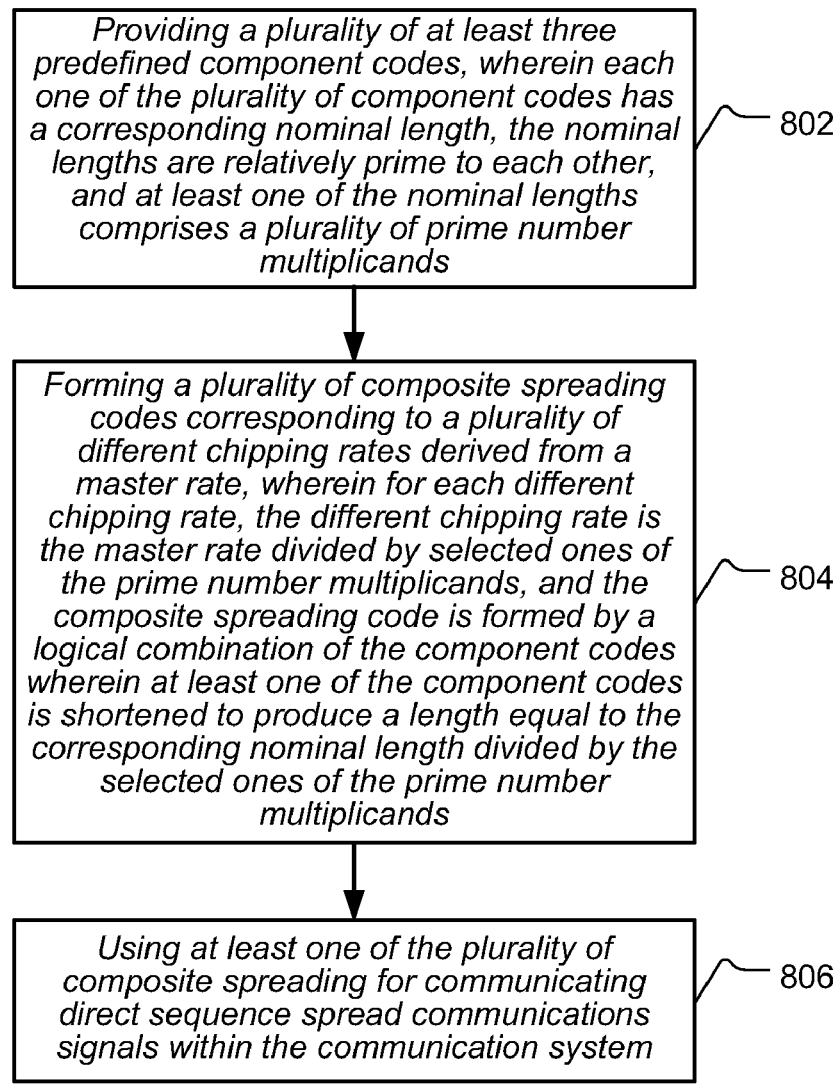
FIG. 8 is a flow chart of a method for accommodating multiple chipping rates in a direct sequence spread spectrum communication system in accordance with some embodiments of the present invention.

FIG. 8 illustrates a flow chart of a method for accommodating multiple chipping rates in a direct sequence spread spectrum system. The method 800 can include providing 802 a plurality of at least three predefined component codes. Each one of the component codes can have a corresponding nominal length. The nominal lengths of the codes can be relatively prime to each other and at least one of the nominal lengths can comprise a plurality of prime number multiplicands, for example, as described above. The component codes can be generated using code generators, for example, as described above in FIG. 2.

The method 800 can also include 804 forming a plurality of composite spreading codes corresponding to a plurality of different chipping rates, all derived from a master rate. The chipping rates can be derived as follows. For each different chipping rate, the master rate can be divided by selected ones of the prime number multiplicands. For example, if the prime number multiplicands include 2, 2, 3 and 5, the chipping rate can be equal to the master rate divided by 2, 3, 4, 5, 6, 10, 12, 15, etc. The composite spreading code can be obtained from a logical combination of the component codes. For example, the logical combination can be MOD, MAJ, or MAND as described above. One of the component codes can be also be shortened by dividing the nominal length by the selected ones of the prime number multiplicands. For example, various ways of forming a plurality of composite spreading codes are described above.

The method 800 can also include using 806 at least one of the plurality of composite spreading codes to communicate a direct sequence spread communications signal in a communication system. For example, the composite code can be used for spreading a signal in a transmitter, despreading a signal in a receiver, or both. For example, various implementations of direct sequence transmitters and receivers using composite codes are described above in relationship to FIGS. 3, 4, 6 and 7.

If desired, the method can also include defining a plurality of different data rates. The data rates can be defined such that each data rate has a symbol duration corresponding to an integer multiple of a length of at least one of the component codes. For example, for a system having three component codes with nominal lengths of $L_x$, $L_y$, and $L_z$, the symbol duration can be equal to $nL_x$, $nL_y$, $nL_z$, $nL_xL_y$, $nL_xL_z$, etc. wherein n is a positive integer. One or more of the plurality of different data rates can be used in the communication system.

Similarly, if desired, the method can include defining a time division multiple access frame comprising a plurality of slots, wherein the boundaries of the frame and the boundaries of the plurality of slots are substantially time coincident with an integer multiple of an epoch of at least one of the component codes. The slot duration can be constant for all of the plurality of different chipping rates (e.g., shortening a component code length by the same divisor used to form the chipping rate from the master rate), for example, as described above. Different chipping rates can be used in different slots, for example, as described above.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A direct sequence spread spectrum (DSSS) system accommodating variable chipping rates, the system comprising:
 a plurality of at least three predefined component codes, wherein each one of the plurality of component codes has a corresponding nominal length, the nominal lengths are relatively prime to one another, and at least one of the nominal lengths comprises a plurality of prime number multiplicands;

a first terminal comprising a first transmitter configured to transmit a first DSSS signal using a first chipping rate, wherein the first DSSS signal uses a first composite code generated by logically combining the component codes; and a second terminal comprising a second transmitter configured to transmit a DSSS signal using a second chipping rate wherein the second chipping rate equals the first chipping rate divided by at least one of the plurality of prime number multiplicands, and wherein the second DSSS signal uses a second composite code generated by logically combining the component codes, wherein at least one of the component codes is shortened to a length equal to the corresponding nominal length divided by the at least one of the plurality of prime number multiplicands.

2. The system of claim 1, wherein the first transmitter defines a time division multiple access frame comprising a frame boundary and a plurality of slot boundaries, wherein the frame boundary and the plurality of slot boundaries are substantially time coincident with epochs of at least one of the component codes.

3. The system of claim 2, wherein the second transmitter transmits a DSSS signal during a time interval substantially bounded by adjacent ones of the plurality of slot boundaries.

4. The system of claim 1, wherein the first transmitter defines a time division multiple access frame comprising a frame boundary and a plurality of slot boundaries, wherein the frame boundary and the plurality of slot boundaries are substantially time coincident with epochs of at least two of the component codes.

5. The system of claim 1, wherein one of the component codes has a nominal length of $2^{n-1}$, wherein n is a positive nonzero integer and one of the plurality of component codes has a length of $2^k$, wherein k is a positive nonzero integer.

6. The system of claim 1, wherein the nominal lengths of the component codes comprise prime number multiplicands of 2, 3, and 5.

7. The system of claim 1, wherein:
the first terminal comprises:
  a plurality of code generators configured to generate corresponding ones of the plurality of at least three predefined component codes, and
  a master clock operating at frequency of R operatively coupled to the plurality of code generators; and
the second terminal comprises:
  a plurality of code generators configured to generate corresponding ones of the plurality of at least three predefined component codes, and
  a master clock operating at frequency of R/f operatively coupled to the plurality of code generators, wherein f is the at least one of the plurality of prime number multiplicands.

8. The system of claim 1, wherein:
the first terminal comprises a first logical combiner configured to logically combine the plurality of predefined component codes, wherein the first logical combiner performs a logical function selected from the group consisting of MOD, MAND and MAJ; and
the second terminal comprises a second logical combiner configured to logically combine the plurality of predefined component codes, wherein the second logical combiner performs a logical function selected from the group consisting of MOD, MAND and MAJ.

9. The system of claim 1 wherein the first terminal further comprises a first receiver configured to receive the second DSSS signal using the second chipping rate wherein the first receiver performs a despreading using the second composite code.

10. The system of claim 1:
wherein the first transmitter is further configured to transmit a third DSSS signal using the second chipping rate, wherein the second DSSS signal uses the second composite code; and
wherein the second terminal further comprises a second receiver configured to receive the third DSSS signal using the second chipping rate wherein the second receiver performs a despreading using the second composite code.

11. The system of claim 1, wherein at least one epoch of the first composite code is substantially time coincident with at least one epoch of the second composite code.

12. A receiver comprising:
a clock source configured to provide a clock;
a plurality of at least three component code generators operatively coupled to the clock source, each component code generator configured to generate a component pseudo random sequence having a corresponding nominal length, wherein the nominal lengths of each of the component pseudo random sequences are relatively prime to each other, and wherein the nominal length of a selected one of the component code generators is divisible by a plurality of prime number multiplicands;
a logical combiner operatively coupled to the component code generators and configured to logically combine the component pseudo random sequences into a composite code;
a slot generator operatively coupled to the clock source and configured to define time division multiple access slots in alignment with an epoch of at least one of the plurality of at least three component code generators;
a scheduler operatively coupled to the clock source and to the plurality of at least three component code generators and configured to selected at least one of the plurality of prime multiplicands for each slot, wherein the clock to the selected one of the component code generators is divided by the at least one of the plurality of prime multiplicands, and wherein a produced length of the selected one of the component code generators is the corresponding nominal length divided by the at least one of the plurality of prime number multiplicands; and
a despreader operatively coupled to the combiner and configured to direct sequence despread a received signal using the composite code.

13. The receiver of claim 12, wherein the nominal length of at least one of the component pseudo random sequences is an integer power of two.

14. The receiver of claim 12, wherein the nominal length of at least one of the component pseudo random sequences comprises a plurality of prime number multiplicands.

15. The receiver of claim 12, wherein the logical combiner performs a logical function selected from the group consisting of MOD, MAND and MAJ.

16. A transmitter comprising:
a clock source configured to provide a clock;
a plurality of at least three component code generators operatively coupled to the clock source, wherein each component code generator is configured to generate a component pseudo random sequence having a corresponding nominal length, the nominal lengths are relatively prime to each other, and the nominal length of a selected one of the component code generators is divisible by a plurality of prime number multiplicands;

a logical combiner operatively coupled to the component code generators and configured to logically combine the component pseudo random sequences into a composite code;

a slot generator operatively coupled to the clock source and configured to define time division multiple access slots in alignment with an epoch of at least one of the plurality of at least three component code generators;

a scheduler operatively coupled to the clock source and to the plurality of at least three component code generators and configured to select at least one of the plurality of prime multiplicands for each slot, wherein the clock to the selected one of the component code generators is divided by the at least one of the plurality of prime multiplicands, and a produced length of the selected one of the component code generators is the corresponding nominal length divided by the at least one of the plurality of prime number multiplicands; and a spreader operatively coupled to the combiner and configured to direct sequence spread a transmit signal using the composite code.

17. The receiver of claim 12, wherein the nominal length of at least one of the component pseudo random sequences is an integer power of two.

18. The receiver of claim 12, wherein the nominal length of at least one of the component pseudo random sequences comprises a plurality of prime number multiplicands.

19. The receiver of claim 12, wherein the logical combiner performs a logical function selected from the group consisting of MOD, MAND and MAJ.

20. A method of accommodating multiple chipping rates in a direct sequence spread spectrum system, the method comprising:

providing a plurality of at least three predefined component codes, wherein each one of the plurality of component codes has a corresponding nominal length, the nominal lengths are relatively prime to each other, and at least one of the nominal lengths comprises a plurality of prime number multiplicands;

forming a plurality of composite spreading codes corresponding to a plurality of different chipping rates derived from a master rate, wherein for each different chipping rate, the different chipping rate is the master rate divided by selected ones of the prime number multiplicands, and the composite spreading code is formed by a logical combination of the component codes wherein at least one of the component codes is shortened to produce a length equal to the corresponding nominal length divided by the selected ones of the prime number multiplicands; and using at least one of the plurality of composite spreading for communicating direct sequence spread communications signals within the communication system.

21. The method of claim 20, further comprising:
defining a plurality of data rates, wherein each data rate has a symbol duration corresponding to an integer multiple of a length of at least one of the component codes, and the epoch has a constant duration for all of the plurality of chipping rates; and transmitting direct sequence spread communications signals comprising data encoded therein using at least two of the plurality of data rates.

22. The method of claim 20, further comprising:
defining a time division multiple access frame comprising a plurality of slots, wherein boundaries of the frame and boundaries of the plurality of slots are substantially time coincident with an integer multiple of an epoch of at least one of the component codes, and the epoch has a constant duration for all of the plurality of chipping rates; and transmitting direct sequence spread communications signals substantially bounded by the slots.

23. The method of claim 20, wherein the logical combination is selected from the group consisting of MOD, MAND and MAJ.

24. The method of claim 20, wherein a first one of the plurality of predefined component codes has a nominal length equal to a power of two, and at least a second one of the plurality of predefined component codes has a nominal length comprising a plurality of prime number multiplicands.

25. The method of claim 20, wherein the communication system is a radio frequency communication system.

26. A direct sequence spread spectrum communication system comprising:

a plurality of at least three predefined component codes, wherein each one of the plurality of component codes has a corresponding nominal length, the nominal lengths are each relatively prime to each other, and at least one of the nominal lengths comprises a plurality of prime number multiplicands;

a plurality of composite spreading codes corresponding to a plurality of different chipping rates derived from a master rate, wherein for each different chipping rate, the different chipping rate is the master rate divided by selected ones of the prime number multiplicands, the composite spreading code is formed by a logical combination of the component codes, and at least one of the component codes is shortened to produce a length equal to the corresponding nominal length divided by the selected ones of the prime number multiplicands;

a plurality of communications terminals configured to communicate there between using a direct sequence spread spectrum signal using a code equal to one of the plurality of composite spreading codes and a chipping rate equal to one of the plurality of different chipping rates.

27. The system of claim 26, wherein the plurality of communications terminals are each further configured to communicate using one of a plurality of data rates, wherein each data rate has a symbol duration corresponding to an integer multiple of a length of at least one of the component codes, and the length has a constant duration for all of the plurality of chipping rates.

28. The system of claim 26, wherein the plurality of communications terminals are each further configured to communicate using direct sequence spread communications signals substantially time bounded by slots of a time division multiple access frame, the time division multiple access frame comprises a plurality of the slots, boundaries of the frame and boundaries of the plurality of slots are substantially time coincident with an integer multiple of an epoch of at least one of the component codes, and the epoch has a constant duration for all of the plurality of chipping rates.

* * * * *